United States Patent
Hetmann et al.

[15] 3,635,303
[45] Jan. 18, 1972

[54] BEARING FOR WHEELS, PARTICULARLY AUTOMOTIVE VEHICLE WHEELS

[72] Inventors: Richard Hetmann, Tamm; Erich Stotz, Rommelshausen; Ludwig Asel, Korntal; Karl Arnold, Korb, all of Germany

[73] Assignee: Dr. Ing. h.c.F. Porsche K.G., Stuttgart-Zuffenhausen, Germany

[22] Filed: Oct. 21, 1969

[21] Appl. No.: 868,148

[30] Foreign Application Priority Data

Nov. 2, 1968 Germany.....................P 18 06 566.2

[52] U.S. Cl...............................................................180/75
[51] Int. Cl..........................................................B60k 17/00
[58] Field of Search..............................180/75; 301/60, 117

[56] References Cited

UNITED STATES PATENTS 2,635,704  4/1953  Herreshoft.............................180/43

Primary Examiner—Martin P. Schwadron
Assistant Examiner—Frank Susko
Attorney—Craig, Antonelli & Hill

[57] ABSTRACT

A bearing for wheels, particularly for automotive vehicle wheels, wherein the wheel bearing inserted in a wheel carrier is held between a wheel spindle associated with a clamping disk and a hub, which has screwless catches disposed radially with respect to the wheel axis, for the rim. The bearing is a multiple-row antifriction roller bearing, the outer ring of which is inserted in a recess of the wheel carrier and the inner ring being clamped between the wheel spindle and the hub. The wheel spindle is tensioned with respect to the inner ring of the bearing by means of an expanding bolt extending in the direction of the wheel axle and the abutment for the expanding bolt is the clamping disk resting in the rim.

29 Claims, 2 Drawing Figures

Inventors
RICHARD HETMANN, ERICH STOTZ, LUDWIG ASEL,
and KARL ARNOLD
BY Craig, Antonelli, Stewart & Hill
Attorneys

BEARING FOR WHEELS, PARTICULARLY AUTOMOTIVE VEHICLE WHEELS

BACKGROUND OF THE INVENTION

The present invention relates to a bearing for wheels, and more particularly, to a bearing for automotive vehicle wheels, wherein the rim is attached to the wheel carrier with the aid of a wedge-shaped clamping member by means of a centrally arranged clamping bolt.

In a conventional automobile wheel bearing, as shown, for example, in German published application 1,009,950, the wheel rim is held on a hub by means of a central mounting bolt or screw. In this construction, the wheel rim has a cup-shaped hub with a clamping bolt disposed in the center, by means of which an expandable sleeve having a conical inner wall is braced in the cup-shaped part. However, this type of central mounting exhibits the disadvantage that the wheel rim is held exclusively by means of a single mounting bolt in a frictional connection. This wheel bearing and mounting is suitable only for the transmission of a relatively minor range of driving torques, since in the case of larger driving torques there is the always present danger that the wheel rim will spin with respect to the wheel hub. Therefore, utilization of light metal rims in a conventional wheel bearing is impossible.

SUMMARY OF THE INVENTION

It is the aim of the present invention to provide a wheel bearing with a central wheel mounting that is lightweight in construction.

It is a further aim of the present invention to provide a bearing for wheels of automotive vehicles suitable for light metal rims, distinguished by a simple structure, low weight, and sure and reliable transmission of the driving power.

The underlying problems are solved in accordance with the present invention by providing that the wheel bearing inserted in the wheel carrier is held between a wheel spindle or trunnion associated with the clamping disk and a hub, which has screwless catches or engaging pieces disposed at a distance with respect to the wheel axis, for the rim.

Advantageously, the outer ring of an antifriction roller bearing is inserted in a recess of the wheel carrier with the inner ring being clamped between the wheel spindle and the hub.

A further advantage resides in the fact that the wheel spindle is tensioned with respect to the inner ring of the antifriction bearing with the aid of an expanding screw extending in alignment with the wheel axle. The abutment for the expanding screw is a conical clamping or tightening disk resting in the rim.

Furthermore, the hub rotating with the wheel spindle is provided with a flange. Distributed along the circumference of this flange, catches or engaging means for the wheel rim are inserted. This flange simultaneously carries the brake member associated with the wheel. This arrangement is preferably such that the catches are formed by cylindrical bolts which can be inserted in guide bushings disposed in the wheel rim. The catches can also be formed by tabular guide bushings inserted in the wheel rim, the length of which is at least three times the diameter thereof.

In a bearing for automotive vehicle wheels where the wheel carrier is fashioned to be steerable, a lock or clamping nut is preferably provided which engages at the wheel carrier and serves to retain the hub with respect to the antifriction bearing. This locknut is disposed in a recess of the rim between the clamping disk and the hub. The locknut is preferably provided with a groove on its outer circumference for receiving a retaining ring which is disposed at a minor axial spacing with respect to an abutment surface provided in the rim. In this connection, the abutment surface is suitably arranged between the retaining ring and the front face of the hub.

In the case of vehicle wheels where the wheel spindle can be connected with a drive link serving to drive the wheel, it is advantageous to connect the wheel spindle in a shape-mating or form-locking manner with the hub, and the hub has a bearing base for the inner ring of the multiple-row antifriction bearing.

With the above arrangement, a compact wheel bearing with small antifriction bearing dimensions results. The bearing, which is also lightweight, is distinguished by a simple drive connection with the wheel spindle being especially suitable for light metal rims. In this connection, the advantage of a central mounting in the wheel axle is preserved.

By the use of an expanding screw for the central mounting, no additional securing means are required and a flush seat of the wheel rim is obtained under all operating conditions. The screwless catches or engaging means inserted in the hub or in the rim, respectively, ensure a flawless mounting of the rim. With this construction, an unintended rotation of the rim with respect to the hub is safely avoided.

The retaining ring prevents the rim from detaching itself from the hub upon breakage of the expanding screw, whereby additional safety is provided in connection with centrally mounted wheels. Furthermore, the wheel spindle can be exchanged at any time quickly and economically after the expanding screw has been released. This provides the additional possibility of mounting the axle shafts in a simple manner without having to disassemble the entire vehicle wheel.

BRIEF DESCRIPTION OF THE DRAWINGS

These and further features, advantages and objects of the present invention will become more apparent from the following description when taken in connection with the accompanying drawings which show, for purposes of illustration only, several embodiments in accordance with the present invention, and wherein.

DETAILED DESCRIPTION OF THE DRAWINGS

Figure 1:
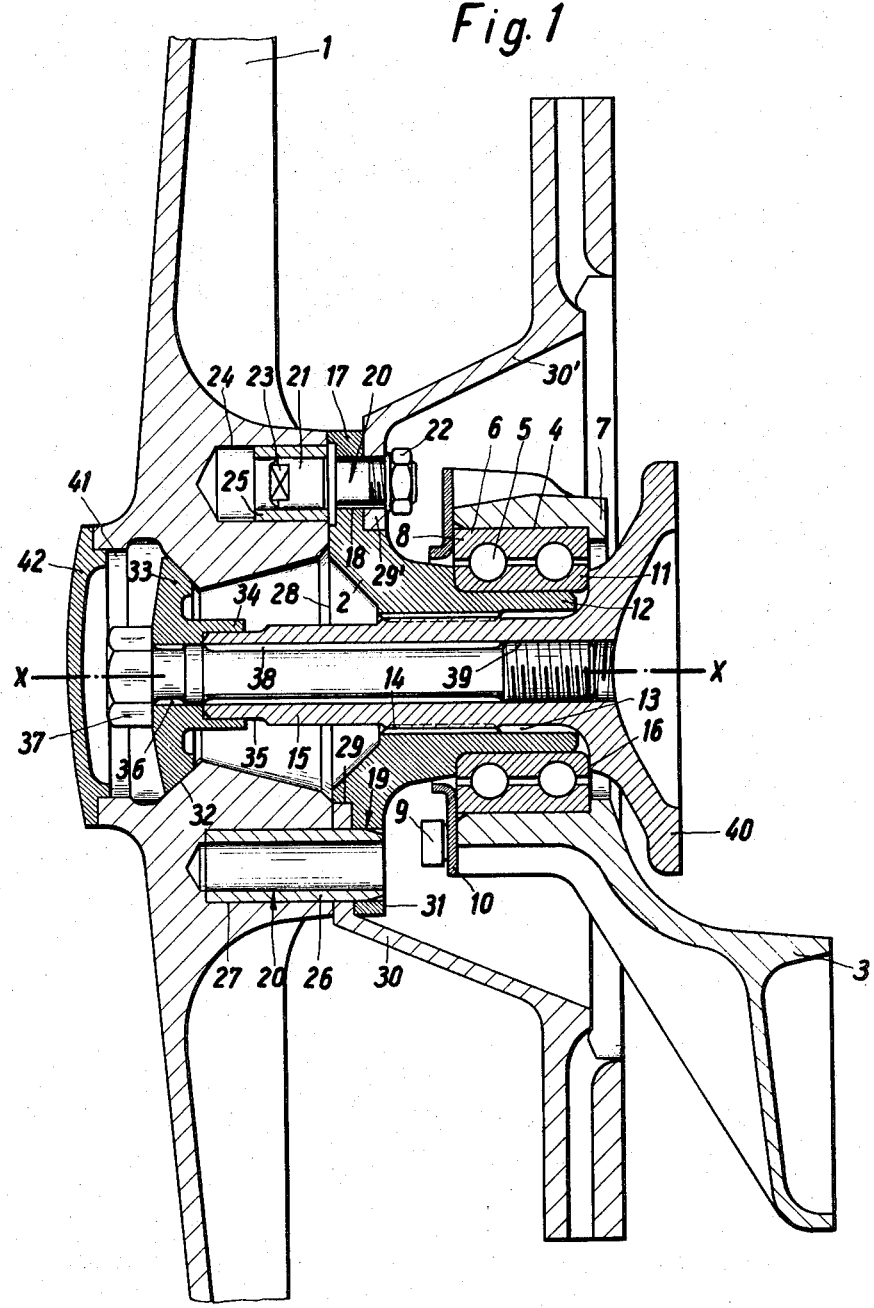
FIG. 1 is a longitudinal sectional view of the bearing of a driven vehicle wheel in accordance with the present invention wherein, above the wheel axis X—X, the catches of the rim are constructed as bolts and below this axis, the catches are constructed as guide bushings.

Referring now to the drawings and, in particular, to FIG 1, the bearing for the vehicle wheel (not completely illustrated) essentially consists of a rim 1 made of a light metal, a hub 2 and a wheel carrier 3 attached to the chassis. The wheel carrier is provided with a recess 4 disposed in the direction of the wheel axis X—X, wherein a multiple-row antifriction roller bearing 5 is inserted. The antifriction bearing 5, along with its outer ring 6 on a collar of the wheel carrier 3, is retained against axial displacement, and the opposite side 8 of the wheel carrier is held by means of a bearing cover or cap 10 attached to the wheel carrier 3 by conventional connecting means such as, for example, threaded screws 9. The inner ring 11 of the antifriction bearing 5 is mounted on a bearing neck or journal 12 of the hub 2.

The hub 2 contains a bore 13 extending in the direction of the wheel axis X—X. This bore 13 is provided with toothing 14 for the form-locking or shape-mating connection with a wheel spindle 15 extending within the bore 13. The wheel spindle 15, which is provided with a collar 16, rests on the front face of the inner ring 11 of the antifriction bearing 5. The hub 2 is also provided with a flange 17 having several bores 18, 19 arranged so that they are distributed at a selected spacing from the wheel axis X—x. The bores 18, 19 serve for the reception and mounting of screwless catches 20.

The catch 20 shown in FIG. 1 above the wheel axis X—X consists of cylindrical bolts 21 inserted in the flange 17 of the hub 2 with the aid of locknuts 22. A dihedral 23 is disposed at the guide section to mount the bolts 21. Steel guide bushings 25 are inserted into the rim bores 24 associated with the catch bolts 21. Another embodiment of the catch 20 is shown in FIG. 1 below the wheel axis X—X. This catch consists of tubular guide bushings 26 inserted in bores 27 of the rim 1. In this particular embodiment, the flange 17 has a centering surface 29 on its front face, a brake or friction disk 30 being held on this centering surface between the rim 1 and the hub 2. On the rear side 31 of the flange 17, a centering guide surface 29' is disposed for holding a friction disk 30'. The friction disk 30' is retained at the flange 17 of the hub 2 by means of the threadedly inserted catch bolts 21.

The rim 1 has a conical-supporting surface 32 in the direction of wheel axis X—X and a conical-clamping disk 33 contacting this surface. The clamping disk 33 is provided with a centering shoulder or lug 34 for centering on a neck 35 of the wheel spindle 15. A bore 36 provided in the clamping disk 33 serves for receiving an expanding screw 37 extending in a recess 38 of the wheel spindle 15 and being connected with the latter by connecting means such as, for example, a threaded portion 39. The wheel spindle 15 has a flange 40 for the mounting of a drive link (not shown). In order to seal the recess 41 of the rim 1, a cover or lid 42 is provided.

When assembling the wheel bearing, the antifriction bearing 5 is first inserted in the wheel carrier 3 to such an extent until the outer ring 6 contacts the collar 7 of the wheel carrier 3. Thereafter, the bearing cover 10 is attached to the opposite side 8 of the wheel carrier 3 by means of the screws 9. The friction disk 30' is placed on the centering surface 29' disposed on the rear side 31 of the flange 17 of the hub 2 and mounted by means of catch bolts 21 inserted in the bores 18 of the flange 17 with the aid of locknuts 22.

The thus-prepared hub is now inserted, along with its bearing neck 12, into the inner ring 11 of the antifriction bearing 5. The wheel spindle 15 is inserted from the rear of the wheel carrier 3 in the bore 13 of the hub 2, which bore has teeth 14, until the collar 16 contacts the inner ring 11 of the antifriction bearing 5. The rim 1 is now pushed onto the catch bolts 21, held and then preliminarily centered by means of the guide bushings or sleeves 25 inserted in the bore 24. By placing the clamping disk 33 in the direction of the wheel axis X—X, the disk is centered on the neck 35 of the wheel spindle 15 by the mounted-centering shoulder 34 and rests against the supporting surface 32.

For attaching the rim 1 on the hub 2, the expanding screw 37 is inserted into the bore 36 of the clamping disk 33 and in the thread 39 of the recess 38 of the wheel spindle 15 and then tightened. When the expanding screw 37 is tightened, the clamping disk 33 rests on the supporting surface 32 of the rim 1, whereby the rim 1 and the hub 2 are clamped with respect to the inner ring 11 of the antifriction bearing 5. The collar 16 at the flange 40 of the wheel spindle 15 serves as an abutment for the inner ring 11.

In the construction of the catches 20 as guide bushings 26, as illustrated in FIG. 1 below the wheel axis X—X, the brake or friction disk 30 is placed on the centering surface 29 of the flange 17 of hub 2 after the antifriction bearing 5 is mounted in the wheel carrier 3 and the hub 2. Now, the rim 1, along with the guide bushings 26 inserted therein, is inserted into the bores 19 of the flange 17 and attached, as mentioned above, with the aid of the clamping disk 33 and the expanding screw 37. Thereby, the brake or friction disk 30 is clamped between the rim 1 and the hub 2 and held against rotation by means of the guide bushings 26. In order to protect the recess 41 of the rim 1 from dust and damage, the lid 42 is provided for sealing the recess 41.

Figure 2:
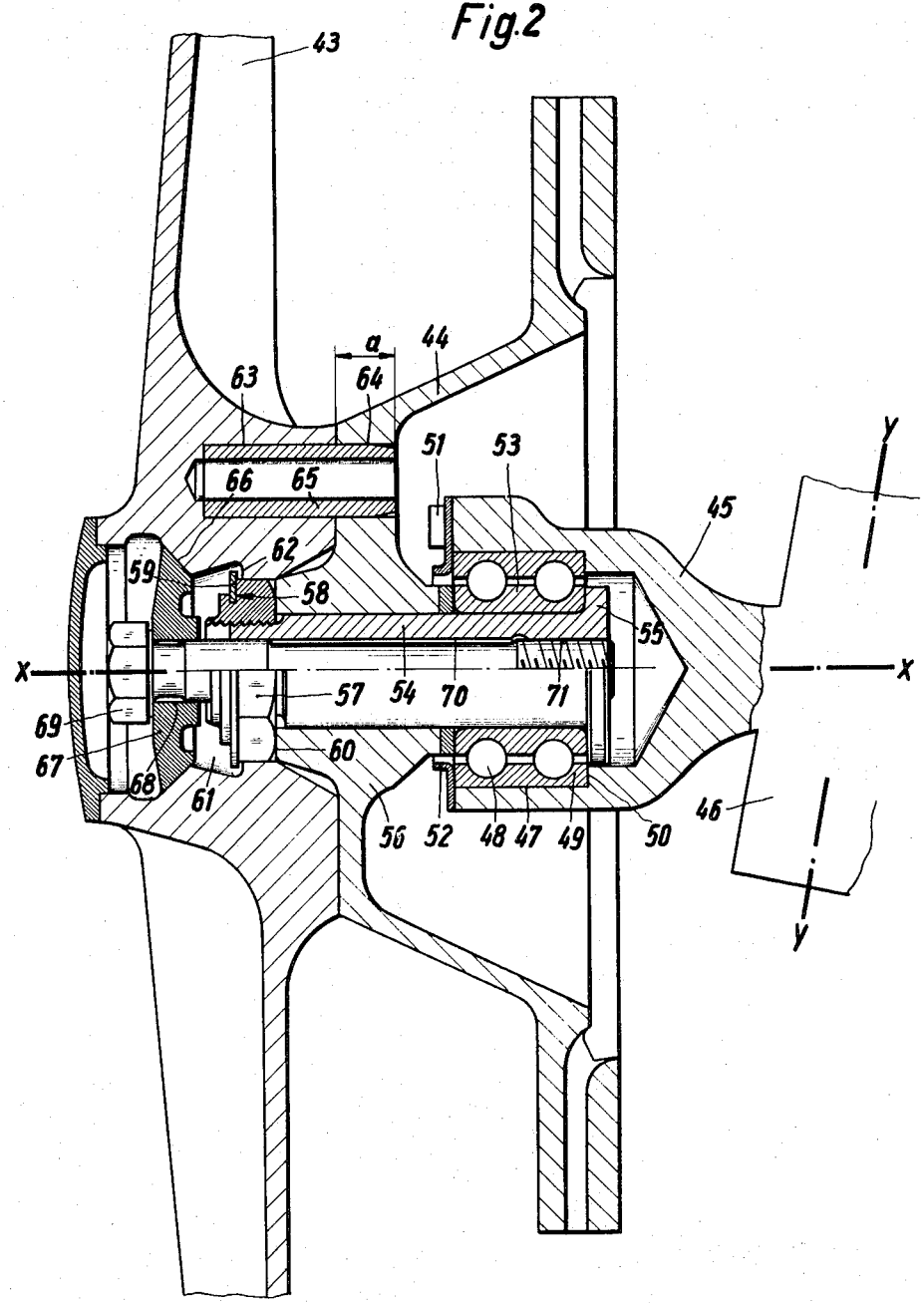
FIG. 2 is a longitudinal sectional view of the bearing of a steerable vehicle wheel according to the present invention.

Referring now to FIG. 2, the bearing consists of a rim 43 consisting of a light metal, a brake or friction disk 44, and a wheel carrier 45. The wheel carrier 45 is disposed so that it may be guided by means of a spring leg or shock absorber strut 46 about the axis Y—Y thereof. A recess 47 is provided in the wheel carrier 45 in the direction of the wheel axis X—X. A multiple-row antifriction bearing 48 is inserted in the recess 47.

The antifriction bearing 48 is clamped, along with its outer ring 49, between a collar 50 of the recess 47 and a bearing cover 52 attached by conventional connecting means such as threaded screws 51 in the wheel carrier 45. A wheel spindle 54 is inserted in the inner ring 53 of the antifriction bearing 48. The wheel spindle 54, which is provided with a collar 55, contacts the inner ring 53 and extends in the direction of the wheel axis X—X. The brake or friction disk 44 has a hub 56, by means of which it is mounted between the rim 43 and the antifriction bearing 48 on the wheel spindle 54. A locknut 57 is provided on the wheel spindle 54 to mount the brake or friction disk 44 on the wheel spindle 54.

The locknut 57 has a groove 58 disposed at the circumference thereof, a retaining ring 59 being inserted in this groove. Between the retaining ring 59 and the front face 60 of the hub 56 of the brake or friction disk 44, the recess 61 of the rim 43 is fashioned so that an abutment surface 62 is provided which, during the mounting of the rim 43, is in contact with the brake or friction disk 44 at a small distance with respect to the retaining ring 59. The brake or friction disk 44 and the rim 43 are provided with several bores 63, 64 disposed so that they are distributed at a spacing with respect to the wheel axis X—X. Guide bushings 65 are inserted in the bore 63 of the rim 43 to such an extent that they project by the magnitude $a$, corresponding approximately to the diameter of the guide bushings 65. In the direction of the wheel axis X—X, the rim 43 is provided with a conical-supporting surface 66 on which a conical-clamping disk 67 rests. The clamping disk 67 has a bore 68 for the reception of an expanding screw 69. The expanding screw 69 extends into a recess 70 of the wheel spindle 54 and is connected with the latter by means of a threaded portion 71.

To assemble this wheel bearing, the antifriction bearing 48 is first placed on the wheel spindle 54 until the inner ring 53 contacts the collar 55 of the wheel spindle 54. The thus-preassembled wheel spindle 54 is now inserted, along with the outer ring 49 of the antifriction bearing 48, in the recess 47 of the wheel carrier 49 up to the collar 50 and held by the bearing cover 52 with the aid of threaded screws 51. Now, the brake or friction disk 44 is placed on the wheel spindle 54 with its hub 56 and clamped tight by means of the locknut 57 to such an extent that the groove 58 of the locknut 57 is disposed at a minor axial spacing with respect to the abutment surface 62 of the recess 61 of the rim 43. The rim 43 is attached to the brake or friction disk 44 by means of its guide bushings 65. The retaining ring 59 is inserted in the groove 58 of the locknut 57. The conical-clamping disk 67 is then placed against the supporting surface 66 of the recess 61 of the rim 43. The expanding screw is inserted through the bore 68 of the clamping disk 67 into the bore 70 of the wheel spindle 54 and connected with the threaded portion 71 of the wheel spindle 54. Thereby, the rim 43 is braced with respect to the brake or friction disk 44. In case the expanding screw 69 breaks during the driving operation of the automotive vehicle, the retaining ring 59 of the locknut prevents the rim 43 from detaching itself from the friction disk 44 by way of the abutment surface 62 of the rim 43.

The disassembly of the above-illustrated embodiments of wheel bearings for automotive vehicles takes place in an analogous manner in the reverse order.

While we have shown and described several embodiments in accordance with the present invention, it is understood that the same is not limited thereto but is susceptible of numerous changes and modifications as known to a person skilled in the art. Thus, it is possible, for example, to employ the mounting of the hub by means of an additional locknut also in connection with the driven vehicle wheels. We, therefore, do not wish to be limited to the details shown and described herein but intend to cover all such changes and modifications as encompassed by the scope of the present invention.

We claim:

1. A bearing assembly for a wheel, particularly for an automotive vehicle wheel, comprising a wheel carrier; a wheel rim; a clamping disc; a centrally arranged clamping bolt for operatively associating said wheel rim with said wheel carrier; bearing means operatively supported by said wheel carrier; a wheel spindle operatively associated with said clamping disc; and a hub means operatively connected to both said wheel spindle and said bearing means, said hub means including a flange portion having entrainment means arranged thereon for cooperating with said wheel rim.

2. An assembly according to claim 1, wherein said entrainment means includes screwless carriers being radially spaced with respect to the axis of the wheel.

3. An assembly according to claim 1, wherein said bearing is a multiple-row antifriction bearing.

4. An assembly according to claim 3, wherein said multiple-row antifriction bearing includes an outer ring being inserted in a recess provided in said wheel carrier and an inner ring being operatively held between said wheel spindle and said hub.

5. An assembly according to claim 4, wherein said entrainment means includes screwless carriers being radially spaced with respect to the axis of the wheel.

6. An assembly according to claim 4, wherein said clamping bolt serves to abut said wheel spindle against said inner ring, said clamping disk being conical and serving as an abutment for said clamping bolt, and said clamping disk being supported in said rim.

7. An assembly according to claim 1, wherein said hub is adapted to rotate with said wheel spindle, said entrainment means being distributed along a circumferential portion of said flange portion, said flange portion operatively carrying braking means associated with the wheel.

8. An assembly according to claim 7, wherein said entrainment means includes screwless carriers being radially spaced with respect to the axis of the wheel.

9. An assembly according to claim 8, wherein said bearing is a multiple-row antifriction bearing.

10. An assembly according to claim 9, wherein said multiple-row antifriction bearing includes an outer ring being inserted in a recess provided in said wheel carrier and an inner ring being operatively held between said wheel spindle and said hub.

11. An assembly according to claim 10, wherein said clamping bolt serves to abut said wheel spindle against said inner ring, said clamping disk being substantially conical and serving as an abutment for said clamping bolt, and said clamping disk being supported in said rim.

12. An assembly according to claim 1, wherein guide bushings are located in said rim, said entrainment means including substantially cylindrical bolts adapted to be inserted into said guide bushings.

13. An assembly according to claim 12, wherein said cylindrical bolts are radially spaced with respect to the axis of the wheel.

14. An assembly according to claim 13, wherein said hub is adapted to rotate with said wheel spindle and said cylindrical bolts being distributed along a circumferential portion of said flange portion, said flange portion operatively carrying braking means associated with the wheel.

15. An assembly according to claim 14, wherein said bearing is a multiple-row antifriction bearing.

16. An assembly according to claim 15, wherein said multiple-row antifriction bearing includes an outer ring being inserted in a recess provided in said wheel carrier and an inner ring being operatively held between said wheel spindle and said hub.

16. An assembly according to claim 16, wherein said clamping bolt serves to abut said wheel spindle against said inner ring, said clamping disk being substantially conical and serving as an abutment for said clamping bolt, said clamping disk being supported in said rim.

18. An assembly according to claim 1, wherein said entrainment means includes tubular guide bushings adapted to be inserted in said rim, said bushing having a length at least equal to three times the diameter thereof.

19. An assembly according to claim 18, wherein said bushings are radially spaced with respect to the axis of the wheel.

20. An assembly according to claim 19, wherein said hub is adapted to rotate with said wheel spindle, said bushings being distributed along a circumferential portion of said flange portion said flange portion operatively carrying braking means associated with the wheel.

21. An assembly according to claim 20, wherein said bearing is a multiple-row antifriction bearing.

22. An assembly according to claim 21, wherein said multiple-row antifriction bearing includes an outer ring being inserted in a recess provided in said wheel carrier and an inner ring being operatively held between said wheel spindle and said hub.

23. An assembly according to claim 22, wherein said clamping bolt serves to abut said wheel spindle against said inner ring, said clamping disk being substantially conical and serving as an abutment for said clamping bolt, and said clamping disk being supported in said rim.

24. An assembly according to claim 6, further including a locknut for engaging at said wheel spindle, said locknut serving to retain said hub with respect to said bearing and being disposed in a recess provided in said rim between said clamping disk and said hub, and said wheel carrier being steerable.

25. An assembly according to claim 24, wherein said locknut is provided with a groove at the outer circumferential portion thereof, said groove serving to receive a retaining ring which is disposed at a minor axial spacing with respect to an abutment surface arranged in said rim.

26. An assembly according to claim 25, wherein said abutment surface is located between said retaining ring and a front face of said hub.

27. An assembly according to claim 1, wherein said wheel spindle is adapted to be connected with a drive link for driving the wheel, said wheel spindle being operatively connected with said hub in a form-locking manner, and said hub having a bearing base for an inner ring of said bearing.

28. An assembly according to claim 27, wherein said entrainment means includes screwless carriers being radially spaced with respect to the axis of the wheel.

29. An assembly according to claim 1, characterized in that said clamping disc is arranged around said clamping bolt in contact with said wheel rim for centering said wheel rim with respect to said wheel carrier.

* * * * *